(12) United States Patent
Ladebeck et al.

(10) Patent No.: US 8,992,768 B2
(45) Date of Patent: Mar. 31, 2015

(54) METHOD FOR THE DESULFURIZATION OF FUELS AND HIGHLY ACTIVE NICKEL CARRIER CATALYST BASED ON ALUMINUM OXIDE SUITABLE FOR SAID METHOD

(75) Inventors: Jürgen Ladebeck, Bad Aibling (DE);
Tiberius Regula, Bad Aibling (DE);
Klaus Wanninger, Kolbermoor (DE);
Wolfgang Gabriel, Rosenheim (DE);
Frank Grossmann, München (DE);
Jürgen Koy, Grosskarolinenfeld (DE)

(73) Assignee: Süd-Chemie IP GmbH & Co. KG, München (DE)

( * ) Notice: Subject to any disclaimer, the term of this patent is extended or adjusted under 35 U.S.C. 154(b) by 1472 days.

(21) Appl. No.: 12/531,540

(22) PCT Filed: Mar. 13, 2008

(86) PCT No.: PCT/EP2008/053038
§ 371 (c)(1),
(2), (4) Date: Jan. 20, 2010

(87) PCT Pub. No.: WO2008/113746
PCT Pub. Date: Sep. 25, 2008

(65) Prior Publication Data
US 2010/0116717 A1  May 13, 2010

(30) Foreign Application Priority Data
Mar. 16, 2007  (DE) .......... 10 2007 012 812

(51) Int. Cl.
| | | |
|---|---|---|
| *C10G 25/00* | (2006.01) | |
| *C10G 45/06* | (2006.01) | |
| *B01J 20/08* | (2006.01) | |
| *B01J 20/28* | (2006.01) | |
| *B01J 23/755* | (2006.01) | |
| *B01J 23/78* | (2006.01) | |
| *B01J 23/89* | (2006.01) | |
| *B01J 35/10* | (2006.01) | |
| *B01J 37/03* | (2006.01) | |
| *B82Y 30/00* | (2011.01) | |
| *C10G 45/48* | (2006.01) | |
| *C10G 45/52* | (2006.01) | |
| *B01J 35/00* | (2006.01) | |
| *B01J 37/00* | (2006.01) | |

(52) U.S. Cl.
CPC .............. *C10G 25/003* (2013.01); *C10G 45/06* (2013.01); *C10G 2300/701* (2013.01); *C10G 2300/202* (2013.01); *C10G 2400/02* (2013.01); *B01J 20/08* (2013.01); *B01J 20/28007* (2013.01); *B01J 20/28014* (2013.01); *B01J 20/2803* (2013.01); *B01J 20/28057* (2013.01); *B01J 20/28069* (2013.01); *B01J 20/28078* (2013.01); *B01J 23/755* (2013.01); *B01J 23/78* (2013.01); *B01J 23/892* (2013.01); *B01J 35/0053* (2013.01); *B01J 35/006* (2013.01); *B01J 35/10* (2013.01); *B01J 35/1019* (2013.01); *B01J 35/1038* (2013.01); *B01J 35/108* (2013.01); *B01J 37/0009* (2013.01); *B01J 37/03* (2013.01); *B82Y 30/00* (2013.01); *C10G 45/48* (2013.01); *C10G 45/52* (2013.01)
USPC ............................. 208/217; 208/99; 208/143

(58) Field of Classification Search
USPC ................. 208/97, 99, 142, 143, 208 R, 217;
502/337, 406, 415
See application file for complete search history.

(56) References Cited

U.S. PATENT DOCUMENTS

| | | | |
|---|---|---|---|
| 3,859,370 A * | 1/1975 | Carter et al. | 502/259 |
| 4,634,515 A | 1/1987 | Bailey et al. | |
| 4,920,089 A * | 4/1990 | Van Beek et al. | 502/335 |
| 5,478,791 A | 12/1995 | Baldauf et al. | |
| 5,817,227 A * | 10/1998 | Mikitenko et al. | 208/143 |
| 6,677,271 B1 | 1/2004 | Birke et al. | |
| 7,081,555 B2 | 7/2006 | Himelfarb et al. | |
| 7,172,990 B2 * | 2/2007 | Geyer et al. | 502/326 |

(Continued)

FOREIGN PATENT DOCUMENTS

| | | |
|---|---|---|
| EP | 0092878 A2 | 11/1983 |
| EP | 0168091 A1 | 1/1986 |
| EP | 0181035 A2 | 5/1986 |
| EP | 0290100 A1 | 11/1988 |
| EP | 0398446 A1 | 11/1990 |
| EP | 1364697 A1 | 12/2003 |

(Continued)

OTHER PUBLICATIONS

Scherzer, Julius and A.J. Gruia, Hydrocracking Science and Technology, 1996, pp. 43-44, 48-49.*

Primary Examiner — Renee E Robinson
(74) Attorney, Agent, or Firm — Scott R. Cox

(57) ABSTRACT

A highly active nickel carrier catalyst based on aluminium oxide has a nickel content of approximately 20 to 70 wt.-% (as Ni) and optionally comprises a bonding agent and optionally a promoter, selected from the compounds of Mg, Ti, Pb, Pt, Ba, Ca and/or Cu, wherein the size of the Ni crystallites in the reduced state is in the range of approximately 3.5 to 4.5 nm and the distortion factor of the Ni crystallites is approximately 2 to 5%. In a method for the reduction of the content of sulphur compounds in hydrocarbon-based fuels by selective adsorption of the sulphur compounds on a nickel catalyst, a nickel catalyst based on aluminium oxide is used, particularly the nickel catalyst described above. A nickel catalyst based on aluminium oxide may be used for reducing the sulphur compound content in hydrocarbon-based fuels by selective adsorption of the sulphur compounds on said catalyst and/or for the hydrogenation of aromatic compounds.

11 Claims, 5 Drawing Sheets

(56) References Cited

U.S. PATENT DOCUMENTS

Figure 1:
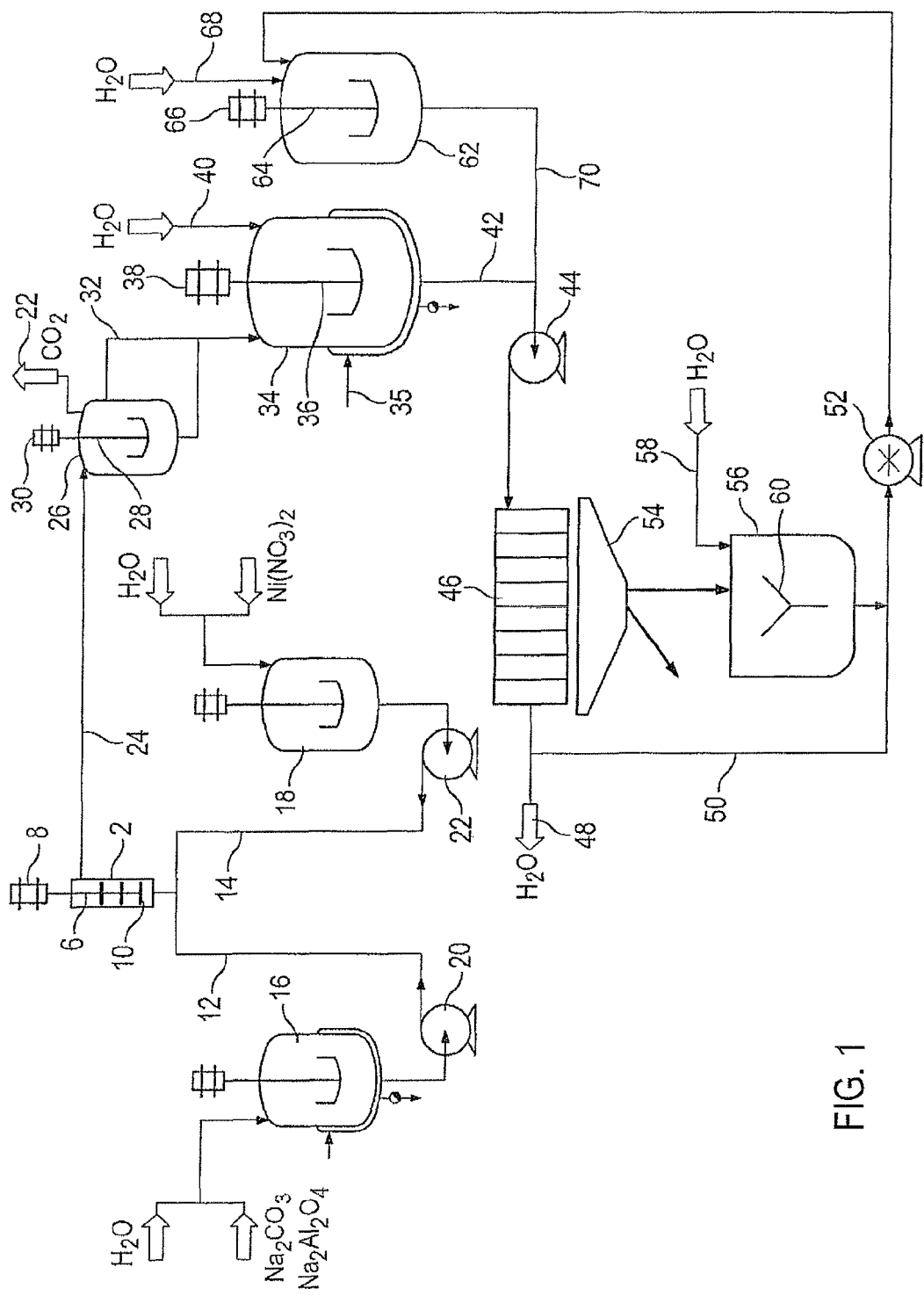

| | | |
|---|---|---|
| 7,230,148 B2 | 6/2007 | Himelfarb et al. |
| 2004/0030208 A1* | 2/2004 | Himelfarb et al. ............ 585/269 |

FOREIGN PATENT DOCUMENTS

| | | |
|---|---|---|
| GB | 1457861 | 12/1976 |
| WO | WO9967018 A1 | 12/1999 |
| WO | WO0039252 A1 | 7/2000 |
| WO | WO0146341 A1 | 6/2001 |
| WO | WO0162871 A1 | 8/2001 |
| WO | WO0170907 A1 | 9/2001 |
| WO | WO0221623 A1 | 3/2002 |
| WO | WO03068892 A2 | 8/2003 |
| WO | WO2004015032 A1 | 2/2004 |
| WO | WO2004026465 A1 | 4/2004 |
| WO | WO2007124328 A2 | 11/2007 |

* cited by examiner

METHOD FOR THE DESULFURIZATION OF FUELS AND HIGHLY ACTIVE NICKEL CARRIER CATALYST BASED ON ALUMINUM OXIDE SUITABLE FOR SAID METHOD

The present invention relates to a method for the desulphurization of fuels, in particular of diesel, and to an adsorption material which can be used therefor, in particular a highly active, aluminium oxide-based, nickel support catalyst.

Desulphurized fuels, i.e. fuels with a greatly reduced sulphur content, are used for example to produce hydrogen for fuel cells on board of motor vehicles. Low sulphur contents would be enough to damage the fuel cells. It is also desirable from an environmental point of view to use fuels, in particular diesel, with a low sulphur content to power motor vehicles.

So-called hydrodesulphurization is mostly used for the desulphurization of diesel and kerosene fractions in refineries. For this, the corresponding fraction is reacted with hydrogen at approx. 450° C., wherein the organosulphur compounds contained in the fraction are converted to hydrogen sulphide which is in turn precipitated to give sulphur in the so-called Claus process. But in smaller applications, the hydrogen sulphide can also be removed with ZnO adsorbers.

Nickel adsorbents are also used for the desulphurization of hydrocarbons, such as for example naphtha, gasoline, diesel and kerosene. These have for example a high nickel content of over 50% on a silicon-based support. Such catalysts are mostly extruded together with an aluminium-based binder and used in the form of the extrudate obtained in this way. Production is in principle by the precipitation of nickel hydroxide from nickel nitrate solution with $Na_4SiO_4$ and a further base followed by extrusion of the $NiO/SiO_2$ powder with a binder consisting of AlO(OH) and an acid. Finally, the catalysts thus have an acid surface.

WO 03/068892 A2 describes, in example 15, a nickel-impregnated Si—Al oxide which is used in the desulphurization of diesel oil. A disadvantage with the catalysts disclosed there is their small capacity which rules out an application on an industrial scale.

WO 99/67018 A1 describes a system for desulphurizing hydrocarbons, for example using a combination of an iron oxide catalyst bed with a nickel catalyst bed (claim 76).

WO 01/46341 A1 and WO 01/62871 A1 describe the desulphurization of gasoline or diesel using a nickel adsorption catalyst not specified in more detail, wherein the presence of oxygenates, such as MTBE, in the fuel stream is essential. These oxygenates are said to prevent the deactivation of the nickel-catalyzed adsorption of organic sulphur from the fuel stream.

Furthermore, WO 01/70907 A1 describes desulphurization with a catalyst consisting of nickel on zinc ferrite, WO 02/21623 A1 describes desulphurization by means of nickel catalysts in the presence of hydrogen, WO 2004/026465 A1 describes desulphurization by means of nickel on ZnO and aluminium oxide and WO 00/39252 A1 describes a desulphurizing system using a nickel catalyst not specified more closely.

A disadvantage with the state of the art described above is firstly the necessity to add substantial quantities of organic compounds such as oxygenates to the fuel in order to achieve a good catalyst activity by avoiding tar formation at the catalyst. Secondly, the previously described catalysts have a small capacity, with the result that they often have to be regenerated or replaced and are also not suitable for desulphurization on a commercial or industrial scale.

The object of the present invention is accordingly to provide a catalytic method for the reduction of the sulphur content of fuels, in particular diesel, and a catalyst for this, wherein the method achieves a high capacity and there is little or no tar formation at the catalyst.

This object is achieved by a method according to the preamble of claim 1, in which a nickel catalyst based on aluminium oxide is used. In other words, a nickel catalyst is used which has as small an acid surface and as few acid centres as possible and therefore contains in particular no silicon compounds, in particular no $SiO_2$.

Within the framework of the invention it was found that acid centres on the surface of the catalyst granules cause the formation of tar and therefore the deactivation of the whole catalyst. By having no silicon in the finished catalyst, excellent desulphurization results are achieved which can be improved still further if catalyst pellets manufactured with neutral binders are used for the desulphurization.

Ideally, the catalyst according to the invention, which is also called adsorption material, has a nickel content of 20 to 70 wt.-% (as Ni). The catalyst according to the invention preferably has a nickel content of approximately 30 to 70 wt.-%, in particular approximately 50 to 69 wt.-% (as Ni). For example, the nickel content is approximately 56 to 58 wt.-%. The size of the Ni crystallites in the reduced state is for example in the range of approximately 3.5 to 4.5 nm. The distortion factor of the Ni crystallites can be approximately 2 to 5%.

The catalyst according to the invention can furthermore contain at least one binder and/or at least one promoter, selected from compounds of Mg, Ti, Pb, Pt, Ba, Ca and/or Cu.

Peptized alumina hydrates for example can be used as binders for the preparation of extrudates. These include for example boehmite which is available under the trade name "Pural SCF" (manufacturer SASOL). These compounds provide excellent support for shaping. This is based on their ability to peptize in the presence of monovalent acids.

The promoter compounds optionally to be used include for example magnesium salts, in particular magnesium nitrate, palladium compounds, titanium compounds and barium compounds.

The use of promoter compounds in nickel catalysts is known per se (see for example EP 0 398 446 A1; EP 0 181 035 A1).

Within the framework of the present invention, a highly active, aluminium oxide-based, nickel support catalyst is preferred, with a nickel content of approximately 20 to 70 wt.-% (as Ni), optionally with a binder and optionally with a promoter, selected from compounds of Mg, Ti, Pb, Pt, Ba, Ca and/or Cu, wherein the size of the Ni crystallites in the reduced state is in the range of approximately 3.5 to 4.5 nm and the distortion factor of the Ni crystallites is approximately 2 to 5%.

Despite its high nickel content, the catalyst according to the invention surprisingly contains Ni crystallites with very small dimensions. Although nickel catalysts with small Ni crystallites are known from EP 0 290 100 A1, these catalysts have only a very low nickel content and thus a low level of activity.

By distortion factor is meant the difference between the X-ray reflex of the 111 main line of the nickel at $2\theta = 44.3°$ in a defect-free nickel lattice and the X-ray reflex of this line in a distorted nickel lattice, such as in the catalyst according to the invention.

The distortion factor is determined from the powder X-ray diffractogram of the particles. Within the framework of the present invention, the Philips APD 1700 powder diffractometer is used to determine the particle size and the distortion factor (strain). For this a "line profile analysis" using Langford's Voigt approximation method is carried out (see J. I. Langford, J. Appl. Crystall. 11 (1978) 10-14). A combination of Gaussian and Lorentz functions is assumed. The background is first determined by measuring pure alpha-aluminium oxide and the XRD spectrum of the sample corrected for it. The line profile analysis is then carried out. The parameters suggested by the apparatus (Lorentz-polarisation factor, $alpha_2$) are adopted. "Mean effective crystallite size" and "mean relative strain" are obtained. The parameter "mean relative strain" corresponds to the distortion factor used for characterization within the framework of the present invention. (The crystallite size is calculated within the framework of the apparatus software from the half-width of the peak and the distortion factor from the ratio of Gaussian to Lorentz function contents.)

The catalyst preferably has a specific BET surface area (total surface area of Ni and support in the reduced state) of approximately 180 to 250, preferably approximately 200 to 230 $m^2/g$. The BET surface area is determined in accordance with DIN 66132.

The specific surface area of the Ni crystallites is determined by CO titration using pulse chemisorption. A catalyst sample of 250 mg is reduced completely at 400° C. 100% $H_2$ (16 hrs). After cooling to 30° C. and rinsing with He, CO is added to the catalyst sample in the form of pulses. The quantity of CO sorbed with each pulse is determined as the difference between the added quantity and the remaining quantity of CO. The sorbed partial quantities of CO are added together. The CO content of each pulse is measured at the gas outlet with the conductivity detector and recorded. If the CO pulses remain the same, the CO absorption is at an end. The CO consumption is calculated by evaluating the recorded pulse sizes at the outlet. The CO consumption is directly proportional to the nickel crystallite size. A monomolecular CO layer on the nickel crystallites is taken as a basis here.

The total pore volume in the reduced state is approximately 150 to 450 $mm^3/g$, preferably approximately 300 to 400 $mm^3/g$, in particular approximately 300 to 350 $mm^3/g$. The total pore volume shows practically no change when the oxidic catalyst precursor is reduced.

Despite their high pore volumes, the shaped catalysts surprisingly have a high degree of hardness, wherein the pellets in general have a lower pore volume than the extrudates.

The catalyst according to the invention is characterized by a pore radii distribution of
7500-875 nm: 0-45 $mm^3/g$
875-40 nm: 2-20 $mm^3/g$
40-7 nm: 20-70 $mm^3/g$
7-3.5 nm: 100-400 $mm^3/g$.

The pore volume and the pore radii distribution are determined using the Hg intrusion method according to DIN 66133.

Compared with known nickel catalysts, the proportion of the pore volume accounted for by smaller pore radii is higher.

The catalyst according to the invention is prepared by combining a mixture of an alkali aluminate solution and an alkaline solution of an alkali compound with a nickel salt solution, filtration, washing, drying, calcining and compression of the obtained precipitate into shaped bodies and optionally reduction of the shaped bodies.

Preferably, the precipitation is carried out in several stages, by first guiding the suspension of the incomplete precipitate into at least one further precipitation chamber to complete the precipitation and allowing the obtained precipitate to age in at least one aging chamber.

The reduction of the oxidic catalyst precursor can be carried out by the manufacturer or by the user. The latter has the advantage that no transportation safety precautions would have to be taken in order to prevent oxidation or autoignition.

If the reduction of the oxidic catalyst precursor is carried out by the manufacturer, the reduced catalyst has to be embedded in a low-flammability medium, preferably in the product to be hydrogenated or in the hydrogenated product, for storage or transport, or there must be a controlled oxidation on the surface. Nitrogen to which increasing quantities of air or oxygen are added is first passed over the reduced catalyst.

The precipitation is preferably carried out with nickel nitrate, sodium aluminate and an alkali carbonate, hydroxide and/or bicarbonate, e.g. sodium carbonate (soda).

The precipitation is preferably carried out at a pH between approximately 7.5 and 9.5, in particular between approximately 8 and 9, at room temperature to approximately 70° C., wherein the temperature of the nickel salt solution is generally higher than that of the aluminate solution.

Preferably, the molar ratio between aluminate and nickel is set to approximately 1:7 to approximately 6:1, preferably to approximately 1:7 to 4:1, particularly preferably to 1:3 to 1:4 and the molar ratio between sodium aluminate and alkali compound to approximately 1:11 to approximately 8:1, preferably to approximately 1:11 to 4:1, particularly preferably to 1:6 to 1:8.

By having no silicon in the precipitation reaction for the preparation of the catalyst, a significant improvement as regards tar formation is already achieved. The sulphur contents are readily reducible, wherein no browning of the desulphurized fuel, which would indicate tar formation, can be seen.

It is also preferable to use the catalyst in pellet form. The pellets are prepared without acid binder, thus for example without silicon oxides, preferably without silicon dioxide. An inactive binder, such as neutral graphite or starch, is preferably used. A further reduction in tar formation is thereby observed.

Not only does the application of the present invention limit or entirely prevent tar formation on adsorbent nickel catalysts, it also makes possible the adsorption of very unreactive sulphur compounds, such as dimethyldibenzothiophene, such as occurs in diesel oil or heating oil, in a usable quantity. Furthermore, the present invention allows the desulphurization of large volumes on a commercial scale.

In principle, the most varied hydrocarbon-based fuels are suitable for the present method, for example naphtha, gasoline, diesel, aviation gasoline, kerosene and/or middle distillate fuels. Preferably, the present invention is carried out with diesel.

By gasoline is meant within the meaning of this invention a mixture of hydrocarbons or a fraction thereof boiling at approximately 37.7° C. to approximately 204.4° C. Such hydrocarbons contain for example hydrocarbon streams from refineries. This also includes cracked gasolines which are the product of a thermal or catalytic process which breaks up larger hydrocarbon molecules into smaller molecules.

By diesel is meant within the meaning of this invention a liquid consisting of a mixture of hydrocarbons with a boiling point of approximately 149° C. to approximately 399° C. or a fraction thereof.

By "sulphur compound" is meant within the meaning of the present invention for example organosulphur compounds, such as mercaptans or thiophene compounds, which are normally contained in cracked gasolines, for example thiophenes, benzothiophenes, alkyl thiophenes, alkyl benzothiophenes and allyl dibenzothiophenes, plus the compounds thereof of higher molecular weight which are usually contained in diesel propellants.

The present invention also relates to the use of the adsorption material according to the invention to reduce the level of sulphur compounds in hydrocarbon-based fuels by selective adsorption of the sulphur compounds on the adsorption material. The fuels that can preferably be used correspond to those described above, wherein diesel is particularly preferred.

The catalysts according to the invention are in principle suitable for the hydrogenation of mono- or polynuclear aromatics and for the removal of organic and/or inorganic sulphur compounds from gases and/or liquids.

Another subject of the present invention is a method comprising the following steps in the given order:
(a) the hydrogenation of aromatics using the catalysts according to the invention, preferably in gasoline or gasoline-precursor fractions in refineries,
(b) the reduction of the level of sulphur compounds in hydrocarbon-based fuels or fuel fractions, in particular diesel, by selective adsorption of the sulphur compounds on the catalyst from step (a), in particular according to one of the afore-described methods.

This method is particularly advantageous, since gasoline for conventional motor vehicles will have to be hydrogenated in future in refineries because of the reduction in the aromatics content which is necessary on legal and environmental grounds. The low quantities of sulphur compounds contained in the corresponding gasoline precursor deactivate to a small extent the nickel catalyst used for the hydrogenation, with the result that it can no longer be used for the hydrogenation which is carried out at lower temperatures than the desulphurization. Nevertheless, it can still be used for the desulphurization of other hydrocarbon fractions, such as diesel. Consequently, the very expensive nickel materials can be used more efficiently. The catalyst can then be used for the desulphurization (step (b)).

Further preferred embodiments of the present invention are defined by the subjects of the dependent claims.

Figure 2:
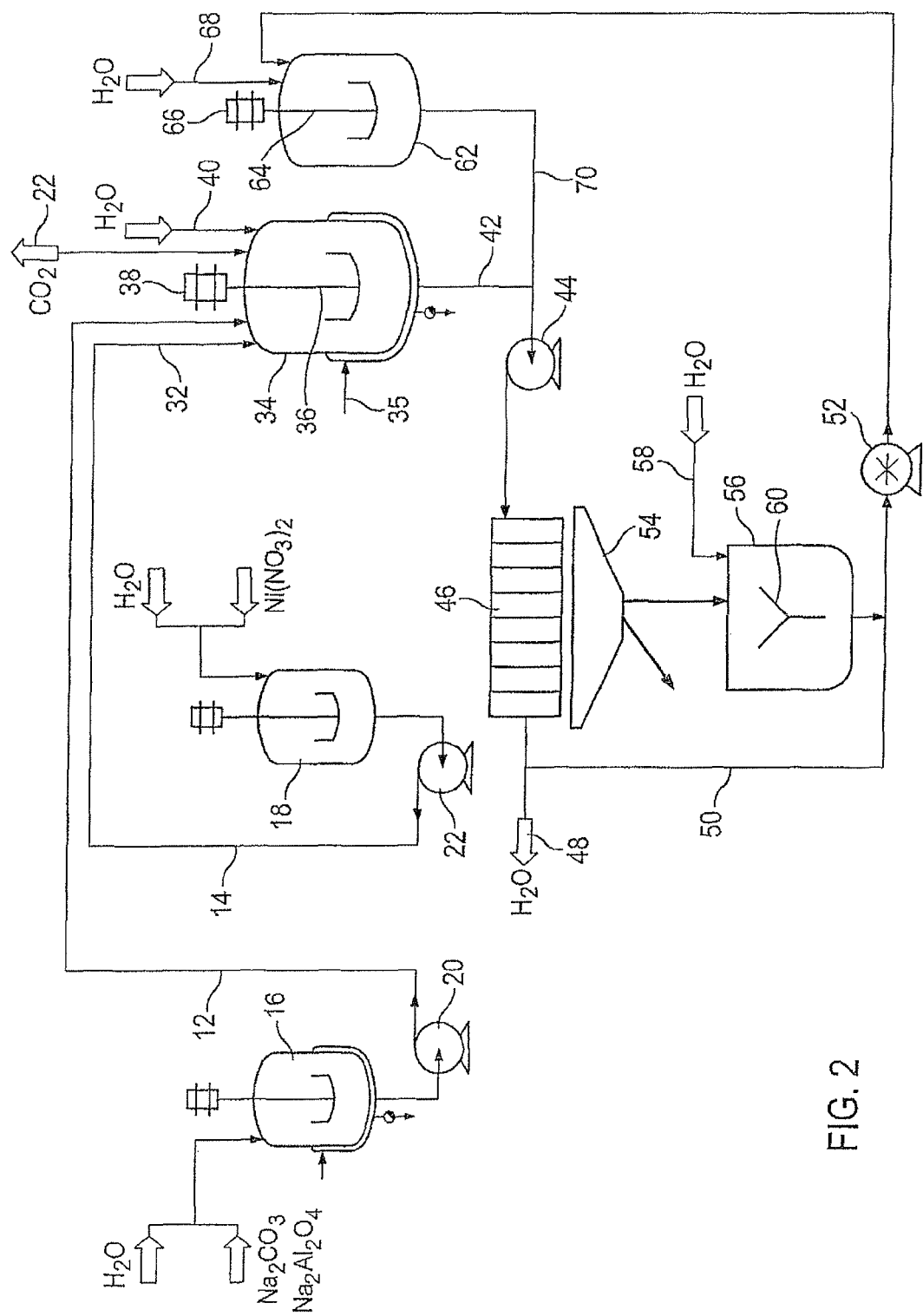
Figure 3:
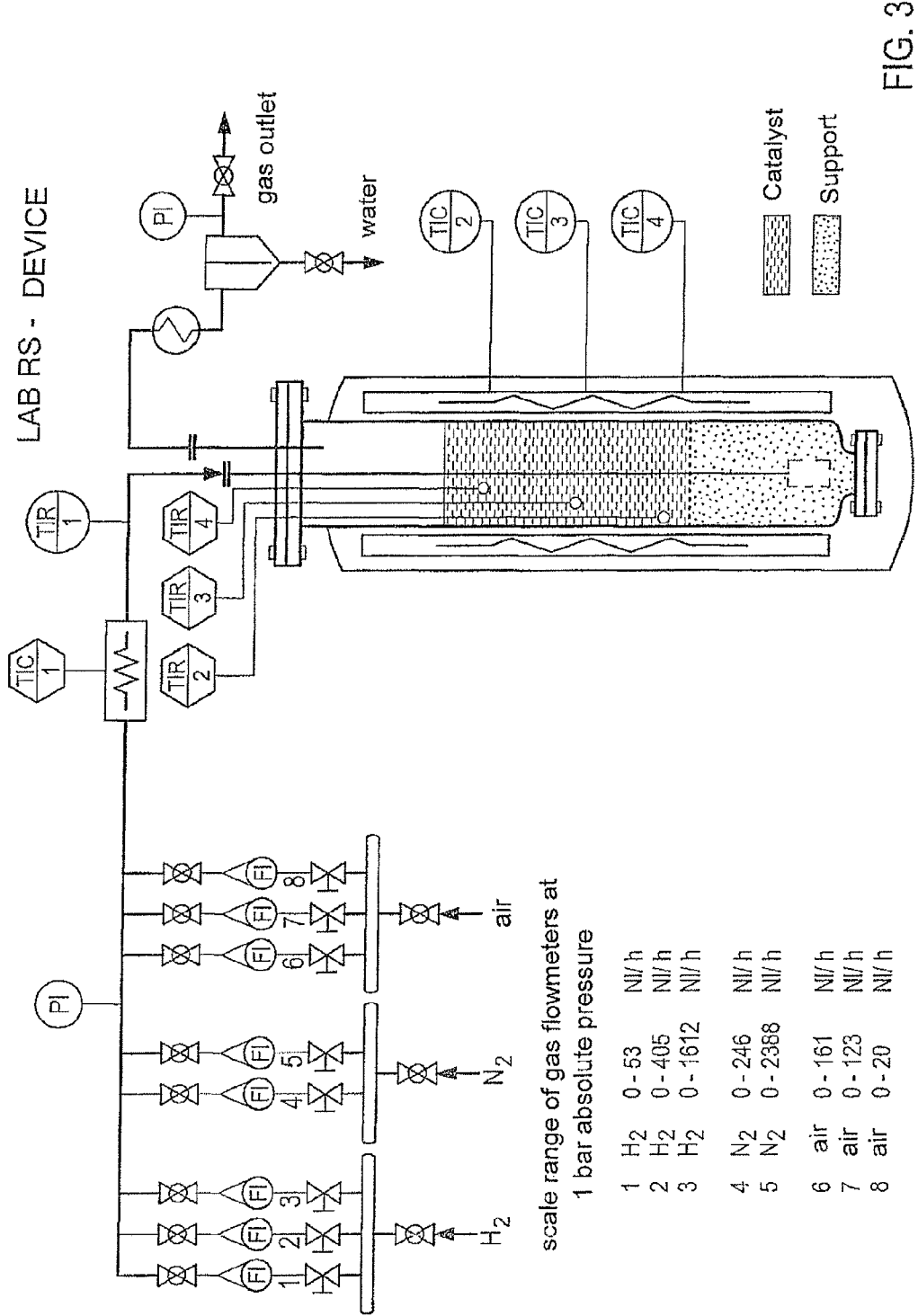

A system for carrying out the method for the preparation of the catalysts according to the invention is represented in the figures. There are shown in:

FIG. 1 a view of the system for carrying out the method according to the invention;

FIG. 2 a variant of the system for carrying out the method according to the invention; and FIG. 3 an apparatus in which the activation and stabilization of the catalyst according to the invention are carried out.

Furthermore, there are shown in

Figure 4:
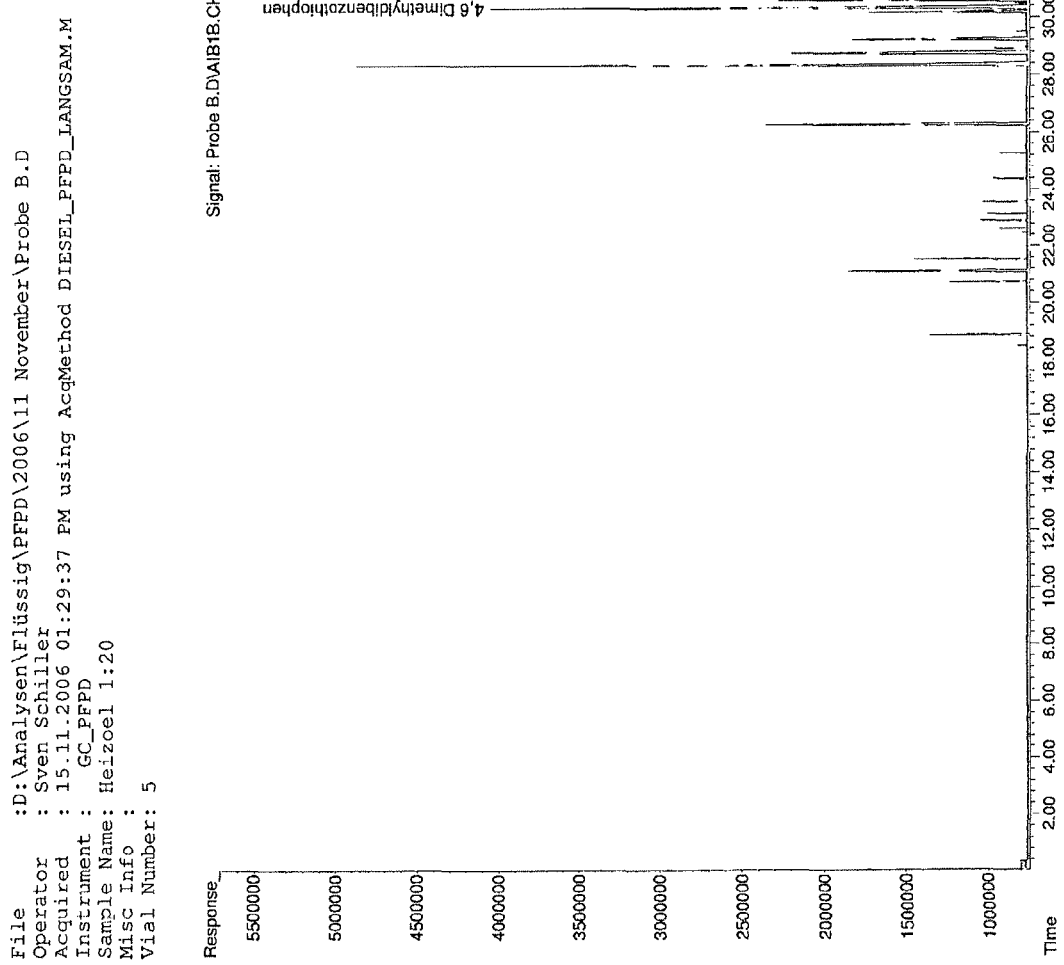

FIG. 4 a gas chromatogram (GC) of a heating oil sample and

Figure 5:
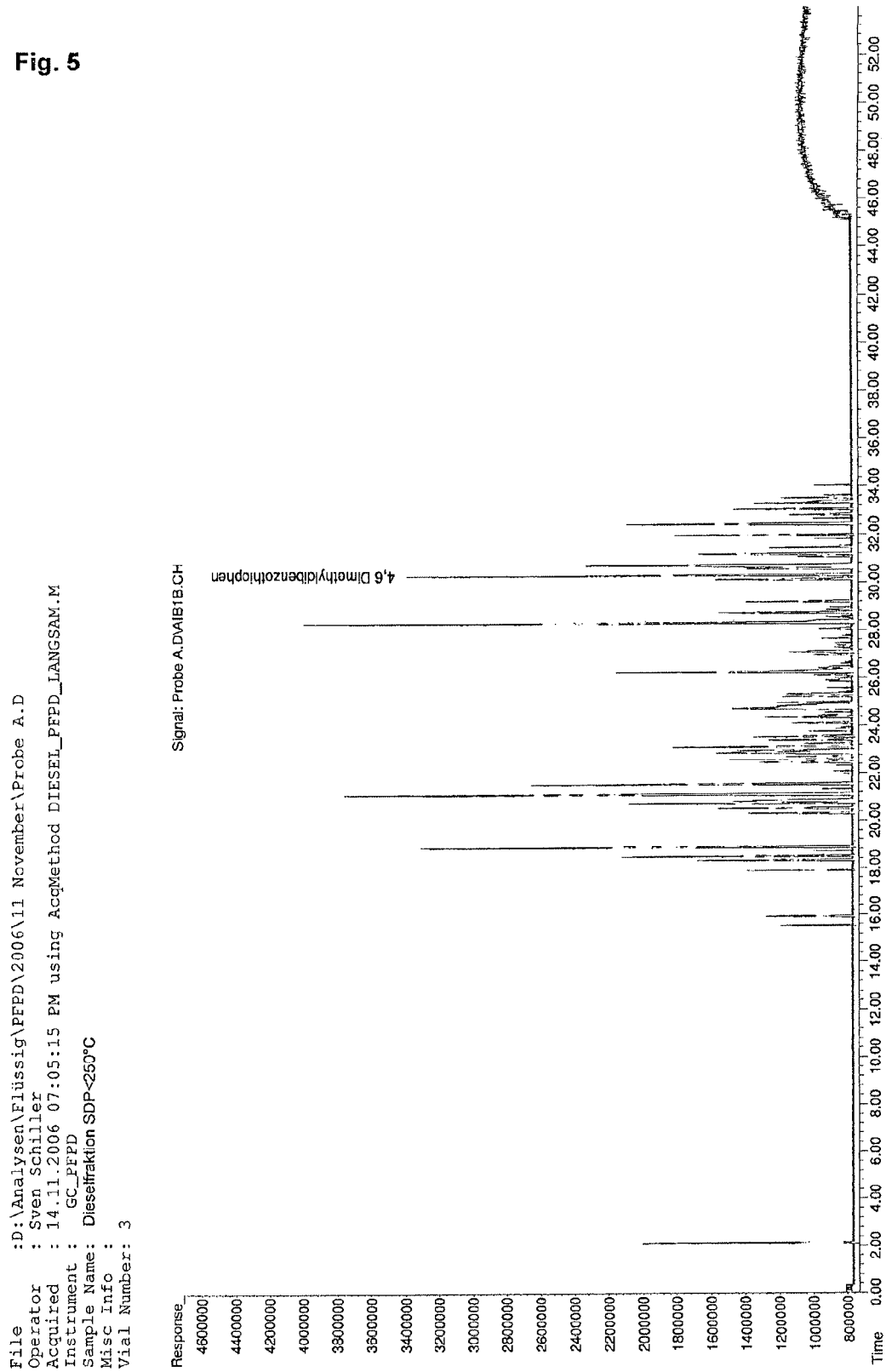

FIG. 5 a GC of a diesel fraction (boiling point ≥250° C.).

According to FIG. 1, the solutions to be mixed ($Na_2CO_3$ and $Na_2Al_2O_4$ or $Ni(NO_3)_2$) are introduced into the mixer 2 through the feed lines 12 or 14 from the dissolving chambers 16 or 18 by means of the pumps 20 or 22 and mixed there under vigorous stirring.

The precipitation already begins in the mixer 2. The incomplete precipitate obtained is passed via the line 24 into a precipitation chamber 26 in which the precipitation is completed. An agitator shaft 28 which is moved by the stirrer motor 30 rotates in the precipitation chamber 26. There is a sensor (not represented) in the precipitation chamber 26 for determining and adjusting the pH during the precipitation.

At the upper end of the precipitation chamber 26 is an overflow 32 via which the suspension is passed into an aging chamber 34. The $CO_2$ formed during the precipitation is removed via the line 22. There is a sensor in the aging chamber 34 for determining the pH and a heating or cooling apparatus 35 for setting the suitable aging temperature. Furthermore, a stirrer 36 which is driven by a motor 38 can be provided therein. A line 40 with water by which the aged catalyst suspension is pressed into the filter device 46 via the line 42 and the pump 44, opens out into the aging chamber 34. The filtrate is partially removed as wastewater via the line 48, partially recycled via the line 50 and the pump 52. When the filter device 46 is emptied the filter cake drops via a funnel 54 into the collecting vessel 56, where it is elutriated with the help of the stirring unit 60 with fresh water from the line 58. The elutriated suspension combines in the line 50 with the recycled water and is sent into the washing chamber 62 with the help of the pump 52. This is provided with a stirring unit 64 which is driven by a motor 66. Fresh water is introduced into the washing chamber 66 via the line 68. The suspension is then passed back via the line 70 and the pump 44 into the filter device 46, where in turn a separation into filter cake and wastewater takes place. The filter cake can either be reintroduced into the elutriation chamber 56 or, if it is pure enough, removed from the system and finally fed to a drying apparatus, e.g. a spray dryer (not represented). The dried catalyst precursor is then calcined, whereby it is converted to the oxidic form. The catalyst is usually sent to the place of use in this form and reduced in situ there.

The system variant according to FIG. 2 corresponds essentially to the system according to FIG. 1 (same reference numbers). Only the mixer 2 and the precipitation chamber 26 have been omitted, and the precipitation takes place exclusively in the aging chamber 34.

The invention is now described using the following examples, without being limited by them.

Preparation Example 1

Preparation of an Ni Catalyst on Aluminium Oxide

An alkaline $Na_2Al_2O_4$ solution of 898 g $Na_2Al_2O_4$ and 7100 g $Na_2CO_3$ was prepared in distilled water at 25° C. in the dissolving chamber 16, wherein the total solution volume was 66 liters. Separately, a nickel nitrate solution with 2248 g Ni was prepared at 70° C. in distilled water with a total solution volume of 66 liters in the dissolving chamber 18.

The two solutions were pumped simultaneously through the mixer 2 at a temperature of 25° C. and 70° C. The flow rate of the nitrate solution and the alkaline $Na_2Al_2O_4$ solution was in each case 1.1 liter/min. The pH was approximately 9.

The precipitate at the outlet of the mixer 2 had the consistency of a viscous paste. This was continuously pressed into the precipitation chamber 26 with the help of the formed carbon dioxide. The residence time in the precipitation chamber was 12 min and the molar ratio between alkali and acid approximately 1.7.

At the end of the precipitation the temperature in the precipitation chamber 26 was approximately 45° C. The precipitate was pressed into the aging chamber 34 into which water was introduced, and heated to 70° C. within 10 min. $CO_2$ gas formed before and during the aging. The precipitate was stirred for 60 min, wherein a uniform dispersion was obtained. It was then aged for one hour at 70° C. The pH at the start of the aging was approximately 8.9 and at the end of the aging approximately 8.7.

The precipitate was filtered in the filtering device 46 after aging. Filtration took place at a pressure of 8 bar. The filtration time was approximately 10 min. The moist filter cake was elutriated with distilled water (approximately 0.16 m³) in the elutriation chamber 60, passed once more through the filter device and then washed until the Na content of the dried filter cake was less than 700 ppm.

The filter cake was dried at 120° C. for 14 hours in a muffle furnace. The weight of the dried material was approximately 5.4 kg, the sodium content approximately 180 ppm, the yield approximately 95%.

The dried filter cake was calcined for 3 hours at 400° C. The calcined product had a BET surface area of 210 m²/g, an NiO content of 77.9% (85% LOI-free), corresponding to a nickel content of 61.4% (67% LOI-free), a loss on ignition (LOI, at 1000° C.) of 8.3% and an $Al_2O_3$ content of 15%. The total quantity of calcined powder was 3450 g. Both extrudates and pellets were prepared from the calcined powder.

Extrudates (1.5 mm Diameter):

To prepare extrudates 135 g peptized AlO(OH) (Puralox SCF®; manufacturer SASOL) was kneaded for 15 min with 42 g distilled water and 87.5 g 5% ethyl acetate. To this mixture was added 700 g of the calcined catalyst, 400 g water and 37 g "mould-release agent C", from Voidländer GmbH (in principle, a mould-releasing agent known to the person skilled in the art, for example based on stearin, or a mineral oil, can be used for this). The obtained mixture was kneaded for a further 20 min and extruded. The extrudates were calcined in a muffle furnace. The temperature was initially increased to 220° C. at a heating-up rate of 2° C./min. After a holding time of 3 hours the temperature was increased to 350° C. at a heating-up rate of 1° C./min. The holding time at this temperature was 3 hours.

The extrudates were then cooled to room temperature. They were then reduced under the following conditions: the reduction and air-stabilization process was carried out in a heatable laboratory reactor with a capacity of 1 liter. The temperature of the gas entering at three levels of the catalyst bed was measured and recorded (cf. FIG. 3).

The process data during the reduction were as follows:
catalyst volume: 1 liter
pressure: 0.2 bar above atmospheric pressure
GHSV of the reduction gas: 1200 h$^{-1}$
composition of the reduction gas: 2 vol.-% $H_2$ in $N_2$ The catalyst bed and the reduction gas were heated to 350° C. at a heating-up rate of 0.3° C./min. After an hour holding time at this temperature the hydrogen content of the reduction gas was carefully increased to 80% and heated to 430° C. at a heating-up rate of 0.3° C./min. After 6 hours holding time at 430° C. the reduction was at an end.

The reduced catalyst was cooled to 30° C. at a cooling rate of 0.8° C./min under $N_2$ flow-through (GHSV 1200 h$^-$). Air stabilization began at 30° C.

The process data during the stabilization are as follows:
pressure: 0.5 bar above atmospheric pressure
GHSV of the stabilization gas: 1200 h$^{-1}$
stabilization gas: 0.3 vol.-% $O_2$ in $N_2$ The stabilization is at an end when the temperature in the catalyst bed is cooled to 30 to 32° C. with 100% air feed.

The chemical composition and the physical properties are given in table I.

Pellets:

700 g calcined filter cake was screen-granulated and mixed with 14 g (2%) Graphit KS 44 (Lonza). The mixture was compacted, screen-granulated again, and processed into 3×3 mm pellets on the laboratory press. The pellets were reduced like the extrudates. The chemical composition and the physical properties are given in table I.

TABLE I

Chemical composition and physical properties

| | | Form | |
|---|---|---|---|
| | | Extrudates | Pellets |
| Measurements | | 3 mm | 3 × 3 mm |
| Chemical composition | Ni* [%] | 57.7 | 66.7 |
| | NiO* [%] | 73.4 | 84.9 |
| | $Al_2O_3$* [%] | 26.6 | 15.1 |
| | LOI 1000° C. [%] | 6.2 | 8.3 |
| Physical properties | Ni crystallite size [nm] | 4.0 | |
| | Distortion factor [%] | 2.01 | |
| | BET surface area [m²/g] | 217 | 205 |
| | Bulk density [g/l] | 670 | 1040 |
| | Lateral compressive strength  Average [N] | 54** | 88 |
| | Max [N] | 87** | 132 |
| | Min [N] | 17** | 32 |
| | Standard deviation [%] | 24 | 22 |
| | Pore volume [mm³/g] | 366 | 162 |
| | Rel. pore volume [mm³/g] | | |
| | Pore radii range  7500-875 nm | 0.2 | 0.1 |
| | 875-40 nm | 9.5 | 3.3 |
| | 40-7 nm | 89.3 | 87.0 |
| | 7-3.7 nm | 267.2 | 72.5 |

*no loss on ignition
**measured on 5-mm long extrudates

Preparation Example 2

Preparation of an Ni Catalyst on Aluminium Oxide

An alkaline $Na_2Al_2O_4$ solution of 2880 g $Na_2Al_2O_4$ and 1990 g $Na_2CO_3$ was prepared in distilled water at 25° C. in the dissolving chamber 16, wherein the total solution volume was 66 liters. Separately, a nickel nitrate solution with 1470 g Ni was prepared at 70° C. in distilled water with a total solution volume of 66 liters in the dissolving chamber 18.

The two solutions were pumped simultaneously through the mixer 2 at a temperature of 25° C. and 70° C. The flow rate of the nitrate solution and the alkaline $Na_2Al_2O_4$ solution was in each case 1.1 liter/min. The pH was approximately 9.

The precipitate at the outlet of the mixer 2 had the consistency of a viscous paste. This was continuously pressed into the precipitation chamber 26 with the help of the formed carbon dioxide. The residence time in the precipitation chamber was 12 min and the molar ratio between alkali and acid approximately 1.5.

At the end of the precipitation the temperature in the precipitation chamber 26 was approximately 45° C. The precipitate was pressed into the aging chamber 34 into which water was introduced, and heated to 70° C. within 10 min. $CO_2$ gas formed before and during the aging. The precipitate was stirred for 60 min, wherein a uniform dispersion was obtained. It was then aged for one hour at 70° C.

The precipitate was filtered in the filtering device 46 after aging. Filtration took place at a pressure of 8 bar. The filtration time was approximately 15 min. The moist filter cake was elutriated with distilled water (approximately 0.16 m³) in the elutriation chamber 60, passed once more through the filter device and then washed until the Na content of the dried filter cake was less than 700 ppm.

The filter cake was dried at 120° C. for 14 hours in the muffle furnace. The weight of the dried material was approximately 5.2 kg, the sodium content approximately 250 ppm, the yield approximately 95%.

The dried filter cake was calcined for 3 hours at 400° C. The calcined product had a BET surface area of 218 m²/g, an MO content of 48.4% (53.5% LOI-free), corresponding to a nickel content of 38% (42% LOI-free), and a loss on ignition (at 1000° C.) of 9.5%. The total quantity of calcined powder was 3750 g. Both extrudates and pellets were prepared from the calcined powder.

Extrudates (1.5 mm Diameter):

To prepare extrudates 135 g peptized AlO(OH) (Puralox SCF®; manufacturer SASOL) was kneaded for 15 min with 42 g distilled water and 87.5 g 5% ethyl acetate.

To this mixture was added 700 g of the calcined catalyst, 400 g water and 37 g "mould-release agent C", from Voidländer GmbH (as lubricant). The obtained mixture was kneaded for a further 20 min and extruded. The extrudates were calcined in a muffle furnace. The temperature was initially increased to 220° C. at a heating-up rate of 2° C./min. After a holding time of 3 hours the temperature was increased to 350° C. at a heating-up rate of 1° C./min. The holding time at this temperature was 3 hours. The extrudates were then cooled to room temperature.

The reduction was carried out according to the procedure given in preparation example 1. The chemical composition and the physical properties are given in table II.

Pellets:

700 g calcined filter cake was screen-granulated and mixed with 14 g (2%) Graphit KS 44 (Lonza). The mixture was compacted, screen-granulated again, and processed into 3×3 mm pellets on the laboratory press. The pellets were reduced like the extrudates. The chemical composition and the physical properties are given in table II.

TABLE II

Chemical composition and physical properties

| | | Form | |
|---|---|---|---|
| | | Extrudates | Pellets |
| Measurements | | 3 mm | 3 × 3 mm |
| Chemical composition | Ni* [%] | 36.3 | 42.0 |
| | NiO* [%] | 46.2 | 53.4 |
| | $Al_2O_3$ [%] | 53.8 | 46.6 |
| | LOI 1000° C. [%] | 6.8 | 8.7 |
| Physical properties | Ni crystallite size [nm] | 3.9 | |
| | Distortion factor [%] | 2.01 | |
| | BET surface area [m²/g] | 225 | 213 |
| | Bulk density [g/l] | 620 | 1010 |
| | Lateral compressive strength Average [N] | 42** | 96 |
| | Max [N] | 72** | 155 |
| | Min [N] | 14** | 37 |
| | Standard deviation [%] | 26 | 27 |
| | Pore volume [mm³/g] | 322 | 168 |
| | Rel. pore volume [mm³/g] | | |
| | Pore radii range 7500-875 nm | 0.5 | 1.3 |
| | 875-40 nm | 9.2 | 6.3 |
| | 40-7 nm | 53.1 | 62.4 |
| | 7-3.7 nm | 259.2 | 98.2 |

*no loss on ignition
**measured on 5-mm long extrudates

Preparation Example 3

Preparation of an Ni Catalyst on Aluminium Oxide

An alkaline $Na_2Al_2O_4$ solution of 3581 g $Na_2Al_2O_4$ and 548 g $Na_2CO_3$ was prepared in distilled water at 25° C. in the dissolving chamber 16, wherein the total solution volume was 66 liters. Separately, a nickel nitrate solution with 1155 g Ni was prepared at 70° C. in distilled water with a total solution volume of 66 liters in the dissolving chamber 18.

The two solutions were pumped simultaneously through the mixer 2 at a temperature of 25° C. and 70° C. The flow rate of the nitrate solution and the alkaline $Na_2Al_2O_4$ solution was in each case 1.1 liter/min. The pH was approximately 9.

The precipitate at the outlet of the mixer 2 had the consistency of a viscous paste. This was continuously pressed into the precipitation chamber 26 with the help of the forming carbon dioxide. The residence time in the precipitation chamber was 12 min and the molar ratio between alkali and acid approximately 1.45.

At the end of the precipitation the temperature in the precipitation chamber 26 was approximately 45° C. The precipitate was pressed into the aging chamber 34 into which water was introduced, and heated to 70° C. within 10 min. $CO_2$ gas formed before and during the aging. The precipitate was stirred for 60 min, wherein a uniform dispersion was obtained. It was then aged for one hour at 70° C. The pH at the start of the aging was approximately 9.0 and at the end of the aging approximately 8.7.

The precipitate was filtered in the filtering device 46 after aging. Filtration took place at a pressure of 8 bar. The filtration time was approximately 15 min. The moist filter cake was elutriated with distilled water (approximately 0.16 m³) in the elutriation chamber 60, passed once more through the filter device and then washed until the Na content of the dried filter cake was less than 700 ppm.

The filter cake was dried at 120° C. for 14 hours in the muffle furnace. The weight of the dried material was approximately 5.7 kg, the sodium content approximately 400 ppm, the yield approximately 95%.

The dried filter cake was calcined for 3 hours at 400° C. The calcined product had a BET surface area of 235 m²/g, an NiO content of 38.2% (42% LOI-free), corresponding to a nickel content of 30% (33% LOI-free), and a loss on ignition (at 1000° C.) of 9.0%. The total quantity of calcined powder was 3600 g. It was not possible to prepare a stable extrudate from the calcined powder. Very stable pellets were prepared.

Pellets:

700 g calcined filter cake was screen-granulated and mixed with 14 g (2%) Graphit KS 44 (Lonza). The mixture was compacted, screen-granulated again, and processed into 3×3 mm pellets on the laboratory press. The reduction was carried out according to the procedure given in preparation example 1.

The chemical composition and the physical properties are given in table III.

TABLE III

Chemical composition and physical properties

| | | Form |
|---|---|---|
| | | Pellets |
| Measurements | | 3 × 3 mm |
| Chemical composition | Ni* [%] | 42.0 |
| | NiO* [%] | 53.4 |
| | $Al_2O_3$* [%] | 46.6 |
| | LOI 1000° C. [%] | 9.2 |
| Physical properties | Ni crystallite size [nm] | 3.7 |
| | Distortion factor [%] | 2.24 |
| | BET surface area [m²/g] | 228 |
| | Bulk density [g/l] | 980 |
| | Lateral compressive strength Average [N] | 103** |
| | Max [N] | 167** |
| | Min [N] | 34** |
| | Standard deviation [%] | 31 |
| | Pore volume [mm³/g] | 159 |

TABLE III-continued

Chemical composition and physical properties

| | | Form Pellets |
|---|---|---|
| Rel. pore volume [mm³/g] | | |
| Pore radii range | 7500-875 nm | 0.6 |
| | 875-40 nm | 7.4 |
| | 40-7 nm | 94.2 |
| | 7-3.7 nm | 57.2 |

*free from loss on ignition
**measured on 5-mm long extrudates

Preparation Example 4

Preparation of a Mg-promoted Ni Catalyst on Aluminium Oxide

An alkaline $Na_2Al_2O_4$ solution of 898 g $Na_2Al_2O_4$ and 7200 g $Na_2CO_3$ was prepared in distilled water at 25° C. in the dissolving chamber 16, wherein the total solution volume was 66 liters. Separately, a nickel nitrate solution with 2248 g Ni and 735 g $Mg(NO_3)_2 \times 6H_2O$ was prepared at 70° C. in distilled water with a total solution volume of 66 liters in the dissolving chamber 18.

The two solutions were pumped simultaneously through the mixer 2 at a temperature of 25° C. and 70° C. The flow rate of the nitrate solution and the alkaline $Na_2Al_2O_4$ solution was in each case 1.1 liter/min. The pH was approximately 9.

The precipitate at the outlet of the mixer 2 had the consistency of a viscous paste. This was continuously pressed into the precipitation chamber 26 with the help of the formed carbon dioxide. The residence time in the precipitation chamber was 12 min and the molar ratio between alkali and acid approximately 1.6.

At the end of the precipitation the temperature in the precipitation chamber 26 was approximately 45° C. The precipitate was pressed into the aging chamber 34 into which water was introduced, and heated to 70° C. within 10 min. $CO_2$ gas formed before and during the aging. The precipitate was stirred for 60 min, wherein a uniform dispersion was obtained. It was then aged for one hour at 70° C. The pH at the start of the aging was approximately 8.8 and at the end of the aging approximately 8.6.

The precipitate was filtered in the filtering device 46 after aging. Filtration took place at a pressure of 8 bar. The filtration time was approximately 10 min. The moist filter cake was elutriated with distilled water (approximately 0.16 m³) in the elutriation chamber 60, passed once more through the filter device and then washed until the Na content of the dried filter cake was less than 700 ppm.

The filter cake was dried at 120° C. for 14 hours in the muffle furnace. The weight of the dried material was approximately 5.9 kg, the sodium content approximately 200 ppm, the yield approximately 95%.

The dried filter cake was calcined for 3 hours at 400° C. The calcined product had a BET surface area of 205 m²/g, an NiO content of 74.8% (81.5% LOI-free), corresponding to a nickel content of 57% (62.1% LOI-free), and a loss on ignition (at 1000° C.) of 8.2%. The total quantity of calcined powder was 3650 g. Both extrudates and pellets were prepared from the calcined powder.

Extrudates (1.5 mm Diameter):

To prepare extrudates 135 g peptized AlO(OH) (Puralox SCF®; manufacturer SASOL) was kneaded for 15 min with 42 g distilled water and 87.5 g 5% ethyl acetate. To this mixture was added 700 g of the calcined catalyst, 400 g water and 37 g "mould-release agent C", from Voidländer GmbH (as lubricant). The obtained mixture was kneaded for a further 20 min and extruded. The extrudates were calcined in a muffle furnace. The temperature was initially increased to 220° C. at a heating-up rate of 2° C./min. After a holding time of 3 hours the temperature was increased to 350° C. at a heating-up rate of 1° C./min. The holding time at this temperature was 3 hours. The extrudates were then cooled to room temperature.

The reduction was carried out according to the procedure given in preparation example 1. The chemical composition and the physical properties are given in table IV.

Pellets:

700 g calcined filter cake was screen-granulated and mixed with 14 g (2%) Graphit KS 44 (Lonza). The mixture was compacted, screen-granulated again, and processed into 3×3 mm pellets on the laboratory press. The pellets were reduced like the extrudates. The chemical composition and the physical properties are given in table IV.

TABLE IV

Chemical composition and physical properties

| | | Form | |
|---|---|---|---|
| | | Extrudates | Pellets |
| Measurements | | 3 mm | 3 × 3 mm |
| Chemical composition | Ni* [%] | 55.8 | 64.5 |
| | NiO* [%] | 71.0 | 82.1 |
| | $Al_2O_3$* [%] | 1.7 | 2.0 |
| | LOI 1000° C. [%] | 8.3 | 6.2 |
| Physical properties | Ni crystallite size [nm] | 4.3 | |
| | Distortion factor [%] | 1.72 | |
| | BET surface area [m²/g] | 188 | 205 |
| | Bulk density [g/l] | 720 | 1080 |
| | Lateral compressive strength | Average [N] | 64** | 97 |
| | | Max [N] | 108** | 154 |
| | | Min [N] | 24** | 38 |
| | | Standard deviation [%] | 22 | 27 |
| | Pore volume [mm³/g] | 289 | 177 |
| | Rel. pore volume [mm³/g] | | |
| | Pore radii range 7500-875 nm | 0.0 | 0.4 |
| | 875-40 nm | 3.0 | 6.1 |
| | 40-7 nm | 20.6 | 69.3 |
| | 7-3.7 nm | 265.6 | 101.4 |

*no loss on ignition
**measured on 5-mm long extrudates

Preparation Example 5

Preparation of an Pd-promoted Ni Catalyst on Aluminium Oxide

An alkaline $Na_2Al_2O_4$ solution of 898 g $Na_2Al_2O_4$ and 7200 g $Na_2CO_3$ was prepared in distilled water at 25° C. in the dissolving chamber 16, wherein the total solution volume was 66 liters. Separately, a nickel nitrate solution with 2248 g Ni and 17 g $Pd(NO_3)_2 \times 2H_2O$ was prepared at 70° C. in distilled water with a total solution volume of 66 liters in the dissolving chamber 18.

The two solutions were pumped simultaneously through the mixer 2 at a temperature of 25° C. and 70° C. The flow rate of the nitrate solution and the alkaline $Na_2Al_2O_4$ solution was in each case 1.1 liter/min. The pH was approximately 9.

The precipitate at the outlet of the mixer 2 had the consistency of a viscous paste. This was continuously pressed into the precipitation chamber 26 with the help of the formed carbon dioxide. The residence time in the precipitation chamber was 12 min and the molar ratio between alkali and acid approximately 1.7.

At the end of the precipitation the temperature in the precipitation chamber 26 was approximately 45° C. The precipitate was pressed into the aging chamber 34 into which water was introduced, and heated to 70° C. within 10 min. $CO_2$ gas formed before and during the aging. The precipitate was stirred for 60 min, wherein a uniform dispersion was obtained. It was then aged for one hour at 70° C. The pH at the start of the aging was approximately 8.7 and at the end of the aging approximately 8.5.

The precipitate was filtered in the filtering device 46 after aging. Filtration took place at a pressure of 8 bar. The filtration time was approximately 10 min. The moist filter cake was elutriated with distilled water (approximately 0.16 m³) in the elutriation chamber 60, passed once more through the filter device and then washed until the Na content of the dried filter cake was less than 700 ppm.

The filter cake was dried at 120° C. for 14 hours in the muffle furnace. The weight of the dried material was approximately 5.4 kg, the sodium content approximately 170 ppm, the yield approximately 95%.

The dried filter cake was calcined for 3 hours at 400° C. The calcined product had a BET surface area of 220 m²/g, an NiO content of 77.6% (85% LOI-free), corresponding to a nickel content of 60.8% (66.7% LOI-free), and a loss on ignition (at 1000° C.) of 8.7%. The total quantity of calcined powder was 3630 g. Both extrudates and pellets were prepared from the calcined powder.

Extrudates (1.5 mm Diameter):

To prepare extrudates 135 g peptized AlO(OH) (Puralox SCF®; manufacturer SASOL) was kneaded for 15 min with 42 g distilled water and 87.5 g 5% ethyl acetate. To this mixture was added 700 g of the calcined catalyst, 400 g water and 37 g "mould-release agent C", from Voidländer GmbH (as lubricant). The obtained mixture was kneaded for a further 20 min and extruded. The extrudates were calcined in a muffle furnace. The temperature was initially increased to 220° C. at a heating-up rate of 2° C./min. After a holding time of 2 hours the temperature was increased to 350° C. at a heating-up rate of 1° C./min. The holding time at this temperature was 3 hours. The extrudates were then cooled to room temperature.

The reduction was carried out according to the procedure given in preparation example 1. The chemical composition and the physical properties are given in table V.

Pellets:

700 g calcined filter cake was screen-granulated and mixed with 14 g (2%) Graphit KS 44 (Lonza). The mixture was compacted, screen-granulated again, and processed into 3×3 mm pellets on the laboratory press. The pellets were reduced like the extrudates. The chemical composition and the physical properties are given in table V.

TABLE V

| Chemical composition and physical properties | | | |
|---|---|---|---|
| | | \multicolumn{2}{c}{Form} | |
| | | Extrudates | Pellets |
| Measurements | | 3 mm | 3 × 3 mm |
| Chemical composition | Ni* [%] | 57.7 | 66.6 |
| | NiO* [%] | 73.4 | 84.8 |
| | Al₂O₃* [%] | 26.6 | 15.0 |
| | LOI 1000° C. [%] | 6.9 | 8.1 |

TABLE V-continued

| Chemical composition and physical properties | | | |
|---|---|---|---|
| | | Form | |
| | | Extrudates | Pellets |
| Physical properties | Ni crystallite size [nm] | 3.7 | |
| | Distortion factor [%] | 2.24 | |
| | BET surface area [m²/g] | 204 | 212 |
| | Bulk density [g/l] | 680 | 1000 |
| Lateral compressive strength | Average [N] | 53** | 89 |
| | Max [N] | 93** | 145 |
| | Min [N] | 20** | 39 |
| | Standard deviation [%] | 28 | 27 |
| Pore volume [mm³/g] | | 342 | 171 |
| Rel. pore volume [mm³/g] | | | |
| Pore radii range | 7500-875 nm | 0.2 | 0.8 |
| | 875-40 nm | 7.4 | 7.3 |
| | 40-7 nm | 81.1 | 64.2 |
| | 7-3.7 nm | 253.3 | 98.4 |

*no loss on ignition
**measured on 5-mm long extrudates

Preparation Example 6

Preparation of a Ti-promoted Ni Catalyst on Aluminium Oxide

An alkaline $Na_2Al_2O_4$ mixture of 898 g $Na_2Al_2O_4$, 7200 g $Na_2CO_3$ and 225 g $TiO(OH)_2$ was prepared in distilled water at 25° C. in the dissolving chamber 16, wherein the total solution volume was 66 liters. Separately, a nickel nitrate solution with 2248 g and 17 g $Pd(NO_3)_2×2H_2O$ was prepared at 70° C. in distilled water with a total solution volume of 66 liters in the dissolving chamber 18.

The acid solution and the alkaline mixture were pumped simultaneously through the mixer 2 at a temperature of 25° C. and 70° C. The flow rate of the nitrate solution and the alkaline $Na_2Al_2O_4$ solution was in each case 1.1 liter/min. The pH was approximately 9.

The precipitate at the outlet of the mixer 2 had the consistency of a viscous paste. This was continuously pressed into the precipitation chamber 26 with the help of the formed carbon dioxide. The residence time in the precipitation chamber was 12 min and the molar ratio between alkali and acid approximately 1.7.

At the end of the precipitation the temperature in the precipitation chamber 26 was approximately 45° C. The precipitate was pressed into the aging chamber 34 into which water was introduced, and heated to 70° C. within 10 min. $CO_2$ gas formed before and during the aging. The precipitate was stirred for 60 min, wherein a uniform dispersion was obtained. It was then aged for one hour at 70° C. The pH at the start of the aging was approximately 9.0 and at the end of the aging approximately 8.7.

The precipitate was filtered in the filtering device 46 after aging. Filtration took place at a pressure of 8 bar. The filtration time was approximately 10 min. The moist filter cake was elutriated with distilled water (approximately 0.16 m³) in the elutriation chamber 60, passed once more through the filter device and then washed until the Na content of the dried filter cake was less than 700 ppm.

The filter cake was dried at 120° C. for 14 hours in the muffle furnace. The weight of the dried material was approximately 5.7 kg, the sodium content approximately 330 ppm, the yield approximately 95%.

The dried filter cake was calcined for 3 hours at 400° C. The calcined product had a BET surface area of 236 m²/g, an NiO content of 73.9% (80.2% LOI-free), corresponding to a nickel content of 57.3% (63.3% LOI-free), and a loss on ignition (at 1000° C.) of 7.8%. The total quantity of calcined powder was 3630 g. Both extrudates and pellets were prepared from the calcined powder.

Extrudates (1.5 mm Diameter):

To prepare extrudates 135 g peptized AlO(OH) (Puralox SCF®; manufacturer SASOL) was kneaded for 15 min with 42 g distilled water and 87.5 g 5% ethyl acetate. To this mixture was added 700 g of the calcined catalyst, 400 g water and 37 g "mould-release agent C", from Voidländer GmbH (as lubricant). The obtained mixture was kneaded for a further 20 min and extruded. The extrudates were calcined in a muffle furnace. The temperature was initially increased to 220° C. at a heating-up rate of 2° C./min. After a holding time of 3 hours the temperature was increased to 350° C. at a heating-up rate of 1° C./min. The holding time at this temperature was 3 hours. The extrudates were then cooled to room temperature.

The reduction was carried out according to the procedure given in preparation example 1. The chemical composition and the physical properties are given in table VI.

Pellets:

700 g calcined filter cake was screen-granulated and mixed with 14 g (2%) Graphit KS 44 (Lonza). The mixture was compacted, screen-granulated again, and processed into 3×3 mm pellets on the laboratory press. The pellets were reduced like the extrudates. The chemical composition and the physical properties are given in table VI.

TABLE VI

Chemical composition and physical properties

|  |  | Form | |
|---|---|---|---|
|  |  | Extrudates | Pellets |
| Measurements |  | 3 mm | 3 × 3 mm |
| Chemical | Ni* [%] | 54.8 | 63.3 |
| composition | NiO* [%] | 69.7 | 80.6 |
|  | Al$_2$O$_3$* [%] | 26.3 | 14.4 |
|  | LOI 1000° C. [%] | 2.4 | 3.0 |
| Physical | Ni crystallite size [nm] | 4.1 | |
| properties | Distortion factor [%] | 1.80 | |
|  | BET surface area [m²/g] | 224 | 232 |
|  | Bulk density [g/l] | 710 | 1040 |
| Lateral compressive strength | Average [N] | 61** | 96 |
|  | Max [N] | 94** | 152 |
|  | Min [N] | 26** | 42 |
|  | Standard deviation [%] | 31 | 26 |
|  | Pore volume [mm³/g] | 298 | 168 |
| Rel. pore volume [mm³/g] | | | |
| Pore radii range | 7500-875 nm | 0.1 | 0.0 |
|  | 875-40 nm | 2.8 | 4.2 |
|  | 40-7 nm | 63.9 | 54.8 |
|  | 7-3.7 nm | 231.2 | 109.3 |

*no loss on ignition
**measured on 5-mm long extrudates

Preparation Example 7

Preparation of an Ni Catalyst on Aluminium Oxide at a Constant pH (Standard)

An alkaline Na$_2$Al$_2$O$_4$ solution of 898 g Na$_2$Al$_2$O$_4$ and 7100 g Na$_2$CO$_3$ was prepared in distilled water at 25° C. in the dissolving chamber 16, wherein the total solution volume was 66 liters. Separately, a nickel nitrate solution with 2248 g Ni was prepared at 70° C. in distilled water with a total solution volume of 66 liters in the dissolving chamber 18.

The two solutions were pumped simultaneously at a temperature of 25° C. and 70° C. into the aging chamber 34 into which water was introduced (variant of FIG. 2 as precipitation chamber). The flow rate of the nitrate solution and the alkaline Na$_2$Al$_2$O$_4$ solution was in each case 1.1 liter/min. The pH in the aging chamber was set to 9, the temperature to 70° C.

The molar ratio between alkali and acid was approximately 1.7.

At the end of the precipitation it was aged for one hour at 70° C. The pH at the start of the aging was approximately 8.8 and at the end of the aging approximately 9.1.

The precipitate was filtered in the filtering device 46 after ageing. Filtration took place at a pressure of 8 bar. The filtration time was approximately 10 min. The moist filter cake was elutriated with distilled water (approximately 0.16 m³) in the elutriation chamber 60, passed once more through the filter device and then washed until the Na content of the dried filter cake was less than 700 ppm.

The filter cake was dried at 120° C. for 14 hours in the muffle furnace. The weight of the dried material was approximately 5.4 kg, the sodium content approximately 270 ppm, the yield approximately 95%.

The dried filter cake was calcined for 3 hours at 400° C. The calcined product had a BET surface area of 203 m²/g, an NiO content of 80.8% (85% LOI-free), corresponding to a nickel content of 63.5% (67% LOI-free), and a loss on ignition (at 1000° C.) of 6.3%. The total quantity of calcined powder was 3500 g. Both extrudates and pellets were prepared from the calcined powder.

Extrudates (1.5 mm Diameter):

To prepare extrudates 135 g peptized AlO(OH) (Puralox SCF®; manufacturer SASOL) was kneaded for 15 min with 42 g distilled water and 87.5 g 5% ethyl acetate. To this mixture was added 700 g of the calcined catalyst, 400 g water and 37 g "mould-release agent C", from Voidländer GmbH (as lubricant). The obtained mixture was kneaded for a further 20 min and extruded. The extrudates were calcined in a muffle furnace. The temperature was initially increased to 220° C. at a heating-up rate of 2° C./min. After a holding time of 3 hours the temperature was increased to 350° C. at a heating-up rate of 1° C./min. The holding time at these temperatures was 3 hours. The extrudates were then cooled to room temperature.

The reduction was carried out according to the procedure given in preparation example 1. The chemical composition and the physical properties are given in table VII.

Pellets:

700 g calcined filter cake was screen-granulated and mixed with 14 g (2%) Graphit KS 44 (Lonza). The mixture was compacted, screen-granulated again, and processed into 3×3 mm pellets on the laboratory press. The pellets were reduced like the extrudates. The chemical composition and the physical properties are given in table VII.

TABLE VII

Chemical composition and physical properties

|  |  | Form | |
|---|---|---|---|
|  |  | Extrudates | Pellets |
| Measurements |  | 3 mm | 3 × 3 mm |
| Chemical | Ni* [%] | 57.5 | 66.5 |
| composition | NiO* [%] | 73.2 | 84.6 |
|  | Al$_2$O$_3$* [%] | 26.8 | 15.4 |

TABLE VII-continued

Chemical composition and physical properties

| | | | Form | |
|---|---|---|---|---|
| | | | Extrudates | Pellets |
| Physical properties | LOI 1000° C. [%] | | 8.3 | 6.2 |
| | Ni crystallite size [nm] | | 5.4 | |
| | Distortion factor [%] | | 0.94 | |
| | BET surface area [m$^2$/g] | | 201 | 190 |
| | Bulk density [g/l] | | 680 | 1040 |
| | Lateral compressive strength | Average [N] | 54** | 93 |
| | | Max [N] | 102** | 144 |
| | | Min [N] | 12** | 37 |
| | | Standard deviation [%] | 34 | 28 |
| | Pore volume [mm$^3$/g] | | 297 | 173 |
| | Rel. pore volume [mm$^3$/g] | | | |
| | Pore radii range | 7500-875 nm | 1.1 | 0.8 |
| | | 875-40 nm | 11.5 | 7.3 |
| | | 40-7 nm | 199.9 | 92.3 |
| | | 7-3.7 nm | 84.4 | 72.7 |

*no loss on ignition
**measured on 5-mm long extrudates

Application Example 1

Hydrogenation of Aromatics

The catalyst of the preparation example 1 was used to hydrogenate aromatics under the following conditions:
Catalyst volume: 20 mL
Diluent: Silicon carbide (particle size 105-149 µm)
Catalyst dilution: 1 g catalyst/6 g diluent
Reduction of the Catalyst:
Pressure: pressureless
Temperature: 400° C. oxide version/200° C. RS (reduced and stabilized) version
GHSV: 2800 h$^{-1}$ hydrogen
Duration of reduction: 16 h
Test Conditions:
Temperature: 190° C. (average temperature above the catalyst bed)
Pressure: 30 bar
LHSV$_{feed}$: 3 h$^{-1}$
GHSV$_{hydrogen}$: 800 h$^{-1}$
H$_2$/feed ratio: 267 NL/kg (normal liters/kg)
Temperature control: Temperature control over 3 reactor heating zones
Sampling: cumulative sample over approximately 20/25 h
Sample cycle: after 21, 45, 70 h operation time
Test duration: approximately 70 h (1 test week)
Analysis:
The aromatic compounds (mono-, binuclear-, and polynuclear-aromatic) are analyzed using HPLC.
Evaluation of the aromatics constituents in %.
Calibration with
Hexadecane for non-aromatics,
o-xylene for monoaromatics,
1-methylnapthalene for diaromatics,
Phenanthrene for polyaromatics.
The dilutions are prepared with n-heptane.
The standard feed has an aromatics content of approximately 30%.

The results are given in table VIII.

TABLE VIII

Test results of the Ni catalysts for aromatic hydrogenation

| | Aromatics leakage [%] | |
|---|---|---|
| Taking of sample [h] | Catalyst Example 1 1.5 mm extrudates | Catalyst customary in the trade* 1.5 mm extrudates |
| 21 | 7.6 | 15.6 |
| 45 | 12.5 | 20.6 |
| 70 | 14.3 | 22.9 |

*The SUD-Chemie AG catalyst C28 with 52% Ni as NiO, 28% SiO$_2$ and 10% Al$_2$O$_3$ was used as catalyst customary in the trade.

Application Example 2

Desulphurization of Gasoline

The catalyst from preparation example 1 was reduced in the dilution ratio of application example 1 under the conditions given there. The following test conditions were applied:
Temperature: 175° C. (average temperature above the catalyst bed)
Pressure: 10 bar
LHSV$_{feed}$ 8 h$^{-1}$
GHSV$_{hydrogen}$: 800 h$^{-1}$
H$_2$/feed ratio: 267 NL/kg
Temperature control: Temperature control over 3 reactor heating zones
Sampling: cumulative sample over approximately 20/25 h
Sample cycle: after 4, 20, 45, 52, 69, 75, 93 h operation time
Test duration: 93 h
Sulphur content of the gasoline: 37 ppm.
The sulphur leakage is measured with an ANTEK Antec 7000 Sulfur Analyser chemiluminescence detector.
The results are given in table IX.

TABLE IX

Test results of the Ni catalysts for sulphur removal

| | Sulphur leakage [ppm] | |
|---|---|---|
| Taking of sample [h] | Catalyst Example 1 1.5 mm extrudates | Catalyst customary in the trade* 1.5 mm extrudates |
| 21 | 0.5 | 1.8 |
| 45 | 0.8 | 2.3 |
| 70 | 1.1 | 2.8 |

*The catalyst from application example 1 was used as catalyst customary in the trade.

Comparison Application Example

A catalyst bed with a volume of 25 mL is prepared (catalyst from application example 1). As fuel to be desulphurized a diesel with 50 ppm sulphur content is used (mixture of low-sulphur diesel from a commercial filling station containing 6 ppm sulphur and heating oil containing 1600 ppm sulphur in the corresponding ratio). This mixture is characterized, with regard to the distribution of the contained sulphur compounds, by the GC shown in FIG. 4 (column: HP 5 MS (30 m×0.25 mm×0.25 µm), gas flow: 1.2 ml/min; detector: PFPD; injector: Split 1:10; temperature programme: start 60° C., 0 min; 5° C./min to 280° C., 10 min). This is pumped from bottom to top through the adsorbent bed, wherein the liquid is subjected to a nitrogen pressure cushion of 20 bar in order to prevent evaporation or bubbling. LHSV is 1. The desulphurization taking place is examined at various temperatures, wherein the product emerging at the top from the bed was analyzed with ICP-AES and the sulphur content measured.

Table X shows the sulphur contents at various temperatures. The colour of the diesel changed from yellow via orange to deep brown, which is caused by tar formation due to the polymerization of olefins from the diesel.

TABLE X

Test results of desulphurization with a catalyst precipitated on silicon

|  | Diesel | 150° C. | 200° C. | 250° C. | 300° C. | 350° C. |
|---|---|---|---|---|---|---|
| ppm S | 54 | 46 | 48 | 46 | 42 | 37 |

It can be clearly seen that only an insufficient desulphurization can be achieved with a nickel catalyst precipitated on silicon.

Application Example 3

Unlike the comparison application example, in this application example, the catalyst from preparation example 1, extrudates, is used, which is not precipitated on silicon. Table XI shows the results of three desulphurization experiments which were carried out with this catalyst under otherwise the same conditions as in the comparison application example.

TABLE XI

Test results of the desulphurization with a catalyst not precipitated on silicon

| Experiment # | | Diesel | 150° C. | 200° C. | 250° C. | 350° C. | 350° C. (16 h) |
|---|---|---|---|---|---|---|---|
| 1 | ppm S | 54 | 5.6 | 4.1 | 1.6 | <0.5 | |
| 2 | ppm S | 54 | | | | 19 (brown) | 24 (brown) |
| 3 | ppm S | 47 | 5 | 2 | 8 | 9 (red) | |

In Experiment # 1 no discoloration is recorded via the temperature. The best desulphurization result is obtained at 350° C.
Experiment # 2 is carried out at an initial temperature of 350° C., wherein after some time (column "16 h") a discoloration is observed which indicates tar formation.
Experiment # 3 represents a repeat of experiment # 1, wherein the desulphurization is carried out with a diesel with a lower initial sulphur content.
An excellent desulphurization result compared with the comparison example can be achieved at lower temperatures.

Application Example 4

A further reduction in tar formation can be achieved by using pellets of the same catalyst powder (according to preparation example 1). The pellets are prepared without an acid binder, only with neutral graphite. Table XII shows desulphurization experiments with diesel of different sulphur contents on pellets of the catalyst from preparation example 1.

TABLE XII

Test results of the desulphurization with pellets of a catalyst not precipitated on silicon

| Experiment # | Diesel [ppm S] | Temperature [° C.] | LHSV (*) [L/L*h] | Time [h] | Product [ppm S] | L (Diesel)/ L (Adsorbent) |
|---|---|---|---|---|---|---|
| 1 | 48 | 200 | 1 | 4 | 1 | 4 |
|  |  |  |  | 20 | 8 | 20 |
|  |  |  |  | 44 | 18 | 44 |
|  |  |  |  | 68 | 33 | 68 |
| 2 | 240 | 200 | 4 | 4 | 2 | 16 |
|  |  |  |  | 21 | 11 | 84 |
| 3 | 440 | 220 | 2 | 5 | 1 | 10 |
|  |  |  |  | 21.5 | 1 | 43 |
|  |  |  |  | 46.5 | 5 | 93 |

(*) liquid hourly space velocity

In experiment # 1 diesel containing approx. 50 ppm sulphur was used (preparation and characterization analogous to that of comparison application example; contains many higher-boiling compounds such as dimethyldibenzothiophene). It can be clearly seen that the sulphur content in the product increases only slowly and that even after 44 hours less than half of the sulphur is still found in the product. At first the sulphur content actually remains below that of the proportion of dimethyldibenzothiophene which clearly shows that the adsorbent according to the invention reacts with this extremely unreactive sulphur compound.
In experiment # 2 a mixture with a higher sulphur content is used. In spite of this, a satisfactory desulphurization occurs with a higher liquid hourly space velocity.
In experiment # 3 a distillation fraction boiling at 250° C. of highly-sulphurous marine diesel (1 to 2% sulphur content) is used. This fraction still contains 440 ppm sulphur. Moreover, it contains few triple-condensed aromatics and subsequently little of the unreactive component dimethyldibenzothiophene which represents the main component of low-sulphur diesel (cf. experiment # 1). It can be seen that outstanding desulphurization occurs, and also in greater volumes. After 93 L adsorbent over 1 L catalyst the sulphur content increases to only 5 ppm compared with 440 ppm in the starting material. The starting material displays the distribution of sulphur compounds shown in FIG. 5.

Consequently, a desulphurization of large quantities of fuel, in particular diesel, is possible with the present invention, wherein no tar formation is to be observed below approx. 250° C. Furthermore, desulphurization of the unreactive component dimethyldibenzothiophene also takes place. Addition of oxygenates is no longer necessary in order to prevent a tar formation. On the contrary, there is no desulphurization with $SiO_2$-containing acid nickel catalysts.

The invention claimed is:

1. Method for reducing the level of sulfur compounds in hydrocarbon-based fuels or fuel fractions, comprising the following step: reducing the level of sulphur compounds in hydrocarbon-based fuels or fuel fractions by selectively adsorbing the sulphur compounds on a catalyst, which catalyst has previously been used for hydrogenating aromatics in another hydrocarbon fraction,
wherein the catalyst comprises a highly active, aluminum oxide-based, nickel support catalyst comprising approximately 20 to 70 wt.-% nickel (as Ni), wherein the size of the Ni crystallites in a reduced state is in the range of approximately 3.5 to 4.5 nm, and wherein the nickel support catalyst essentially contains no silicon compounds.

2. Method according to claim 1, wherein the catalyst further comprises a binder and/or a promoter, selected from the group consisting of Mg, Ti, Pd, Pt, Ba, Ca and Cu.

3. Method according to claim 1, characterized in that the catalyst has a nickel content of approximately 30 to 70 wt.-% (as Ni).

4. Method according to claim 1, characterized in that the catalyst has a specific BET surface area (total surface area of Ni and support) of approximately 180 to 250 m²/g.

5. Method according to claim 1, characterized in that the specific surface of the Ni crystallites is approximately 70 to 90 m2/g.

6. Method according to claim 1, characterized in that the pore radii distribution of the catalyst is:
7500- 875 nm: 0- 45 mm³/g
875- 40 nm: 2- 20 mm³/g
40- 7 nm: 20- 70 mm³/g, and
7- 3.5 nm: 100- 400 mm³/g.

7. Method according to claim 1, characterized in that the catalyst is used in pellet form.

8. Method according to claim 7, characterized in that the pellets do not contain an acid binder.

9. Method according to claim 7, characterized in that the pellets further comprise graphite as a binder.

10. Method according to claim 1, characterized in that the total pore volume of the catalyst in the reduced state is approximately 150 to 450 mm3/g.

11. Method according to claim 1 wherein the hydrocarbon-based fuels or fuel fractions comprises diesel.

* * * * *